July 13, 1965  D. A. MEEKER  3,194,287
FOOD CUTTING APPARATUS
Filed Nov. 6, 1963  4 Sheets-Sheet 1
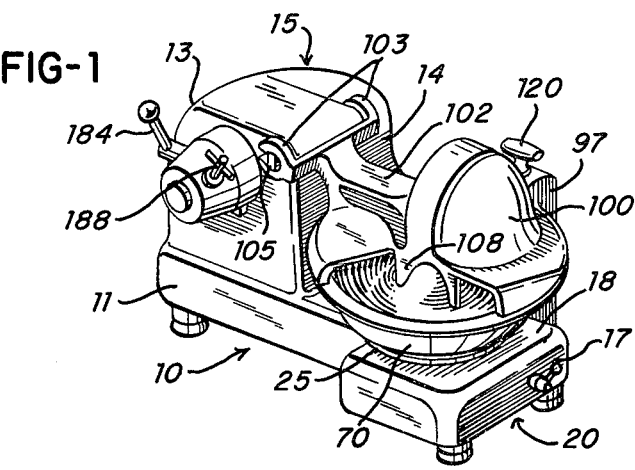
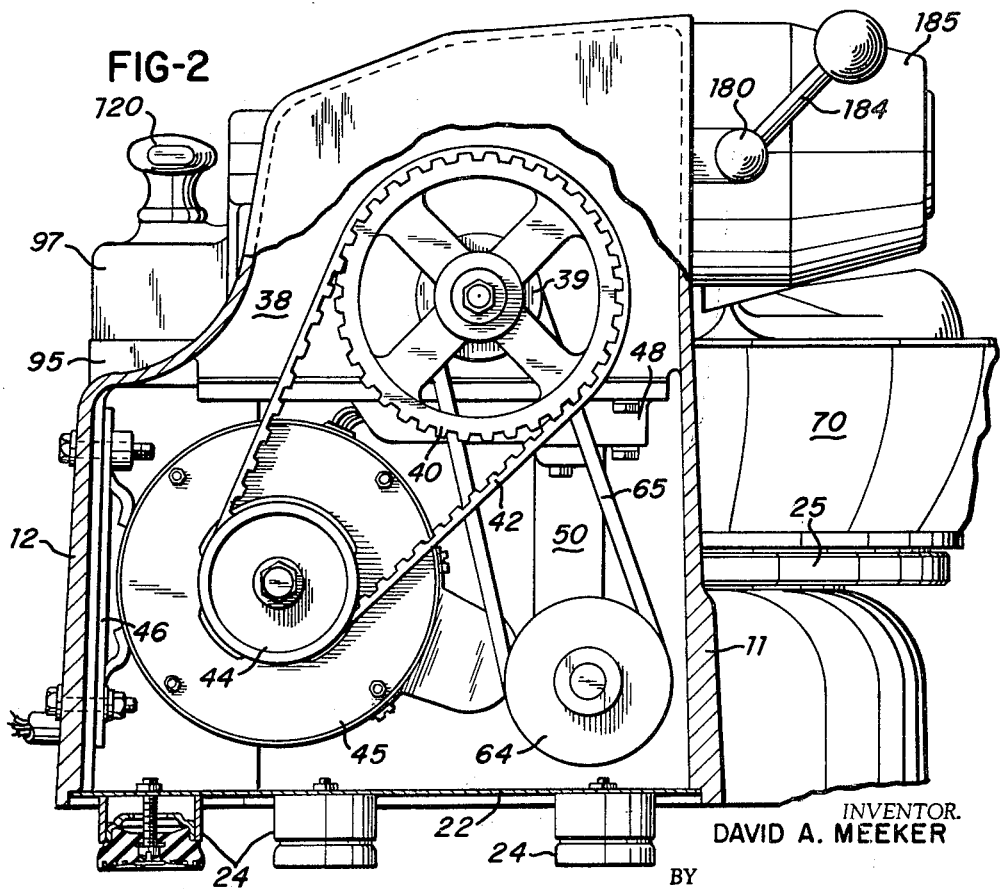
INVENTOR.
DAVID A. MEEKER
BY
Marechal, Biebel, French & Bugg
ATTORNEYS

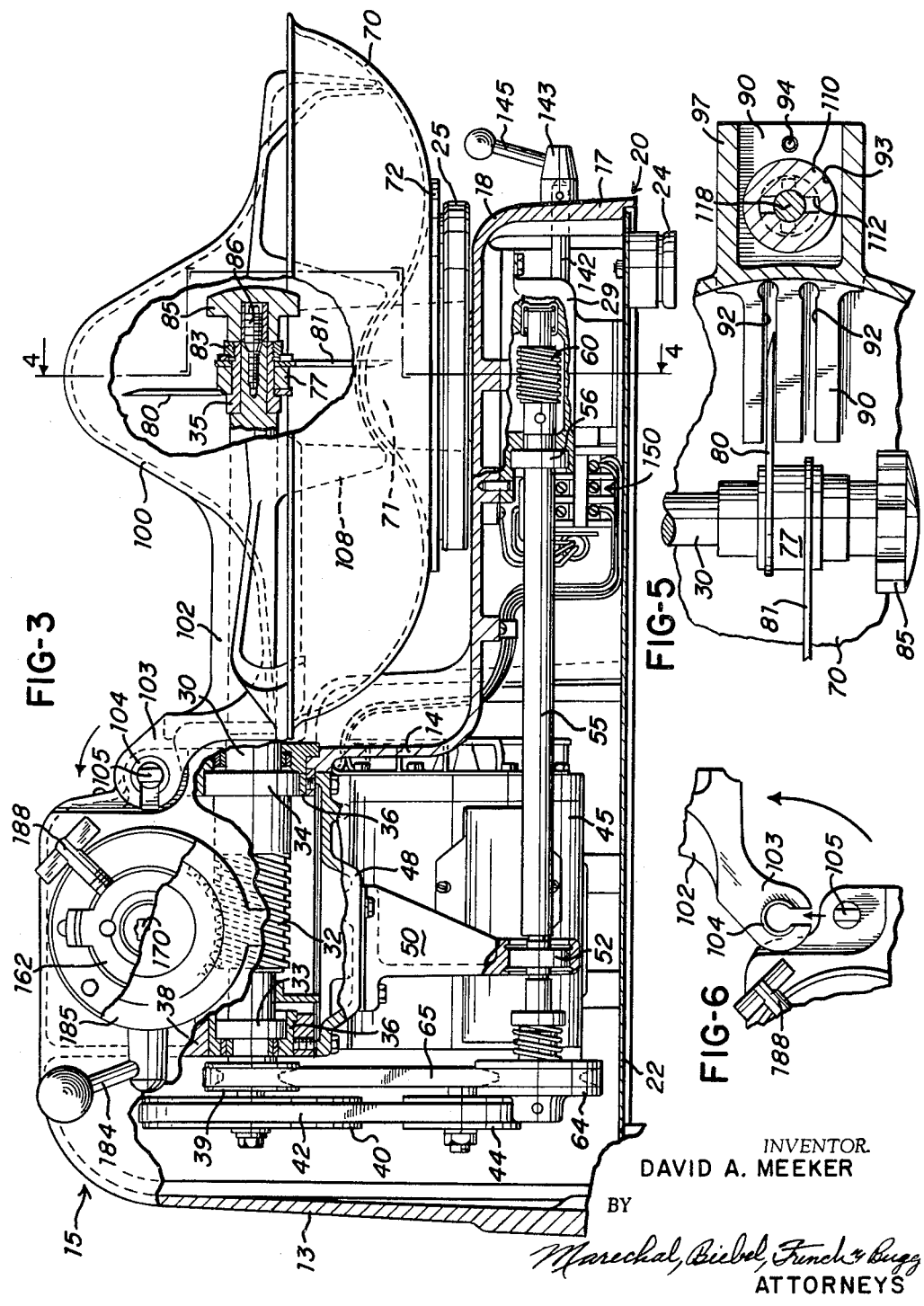

July 13, 1965
D. A. MEEKER
3,194,287
FOOD CUTTING APPARATUS
Filed Nov. 6, 1963
4 Sheets-Sheet 3
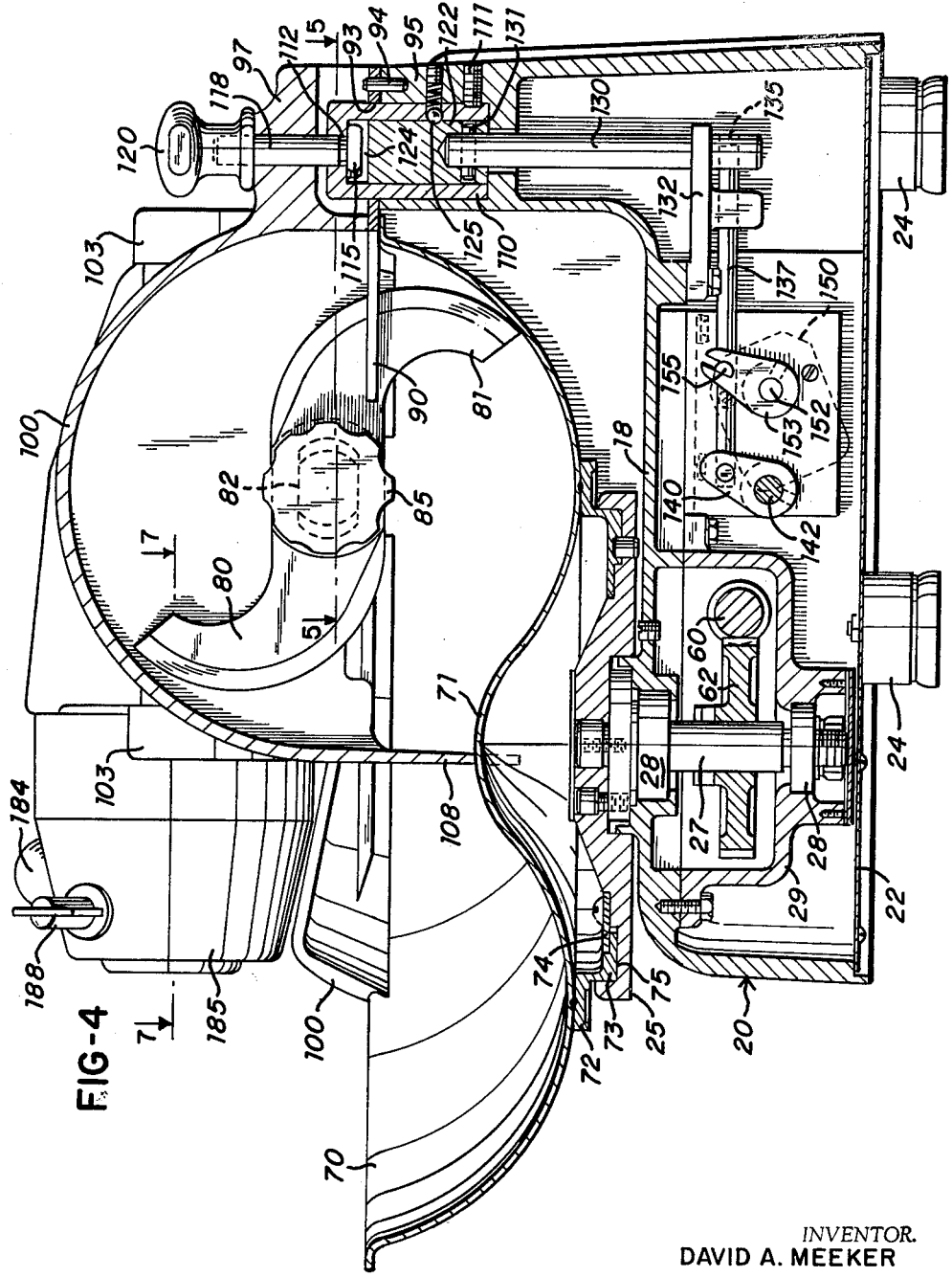
INVENTOR.
DAVID A. MEEKER
BY
Marechal, Biebel, French & Bugg
ATTORNEYS July 13, 1965 D. A. MEEKER 3,194,287
FOOD CUTTING APPARATUS
Filed Nov. 6, 1963 4 Sheets-Sheet 4
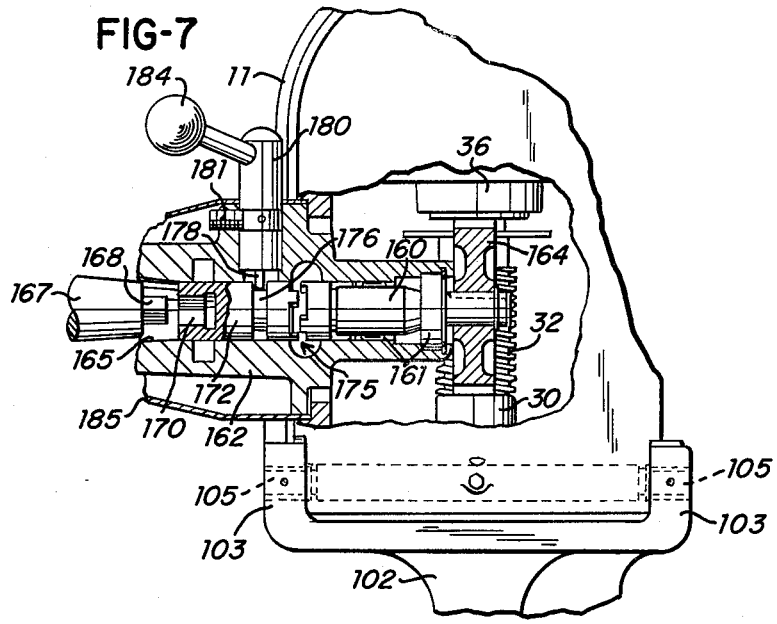
INVENTOR.
DAVID A. MEEKER
BY
Marechal, Biebel, French & Bugg
ATTORNEYS 3,194,287
FOOD CUTTING APPARATUS
David A. Meeker, Troy, Ohio, assignor to The Hobart Manufacturing Company, Troy, Ohio, a corporation of Ohio
Filed Nov. 6, 1963, Ser. No. 321,779
7 Claims. (Cl. 146—67)

This application relates to food cutting apparatus, and particularly to improvements in food cutting machines.

Food cutting machines of the type with which the present invention is concerned are used for example, to reduce large chunks of foodstuff, for example meat or vegetables, to smaller size pieces. Generally, such machines include a drive motor having an output shaft and one or more knife blades on this shaft which rotate about a horizontal axis, hence in a generally vertical plane or planes, and in which a bowl is provided cooperating with the knife member to carry the material to and from the knife. The knife member cooperates with a stationary member, hereinafter referred to as a comb, which provides an edge past which the knife member passes to produce the requisite cutting action. The bowl has a raised center, and the shape of the bowl can be described in geometric terms as having the general shape of the lower half of a torus.

The knife or knives are of such size that the arc which the tip of the knife describes coincides generally with a section through the bowl from its center to one edge. As the knife member is rotated, the bowl is preferably also rotated about a vertical axis to carry the material past the knife member and comb. For safety reasons, the machine is provided with a cover extending over the knife and associated portion of the bowl, leaving an opening into which large chunks can be fed and through which the reduced pieces can be removed.

Machines of this type also have as a general rule a power take-off coupling and mount to which various food preparing accessories can be attached. For example, one such accessory is a food and meat chopper of the screw type, another is an apparatus for slicing, dicing or grating vegetables and fruits, and another may be an accessory device to unload the products from the food cutter bowl as the food cutter is operated. These accessory devices, which are of known construction, include standard attachment hubs and the like for selective mounting on the power take-off of the food cutter. To permit the use of these in a minimum of required space and at a point of maximum convenience a new location for this power take-off is provided between the knife shaft bearings, as compared to overhanging the end of the machine as in previous machines of this type.

Accordingly, the present invention provides a novel improved construction and arrangement of a food cutting machine in which the power take-off coupling is located substantially closer to the food cutter bowl than has heretofore been customary.

Another object of the invention is to provide a novel food cutter construction in which the power take-off has a drive connection from the main shaft of the food cutter at a location on the main shaft between spaced support bearings.

Another object of the invention is to provide, in connection with such a food cutter and power take-off, a selectively operable clutch which enables the operator to control the application of power through the power take-off to an accessory while the food cutter remains in continuous operation.

An additional object of the invention is to provide such an improved food cutting machine wherein the drive motor and its power connection to the main shaft of the cutter are easily repaired or replaced without need to disassemble the basic structure of the food cutter or the power take-off arrangement.

Other objects and advantages of the invention will be apparent from the following description, the accompanying drawings and the appended claims.

In the drawings—

FIG. 1 is a perspective view showing the overall arrangement and appearance of a food cutting machine in accordance with the invention;

FIG. 2 is an end view of the machine, as seen from the left of FIG. 1, with a portion of the housing broken away to show the drive motor and various drive connections;

FIG. 3 is a front view of the food cutting machine, with a portion of the housing and portions of the internal parts broken away and shown in section;

FIG. 4 is a sectional view taken generally on line 4—4 of FIG. 3;

FIG. 5 is a detail sectional view along line 5—5 of FIG. 4;

FIG. 6 is a detail view showing the cover hinge with the cover in an open position to illustrate the manner in which the parts of the hinge can separate for removal of the cover;

FIG. 7 is a detail sectional view, with some adjoining parts shown in elevation, taken on line 7—7 of FIG. 4;

FIG. 8 is a sectional view of the cover lock and interlock construction shown in FIG. 4, with the parts in a different position as would occur when the protective cover is to be removed; and FIG. 9 is a detail sectional view of the interlock mechanism, taken on line 9—9 of FIG. 8.

Referring to the drawings, which show a preferred embodiment of the invention, and particularly with reference to FIG. 1, the food cutting machine includes a housing, indicated by the general reference numeral 10. This housing includes front and rear walls 11 and 12 (FIG. 2), and at one side of the housing there are side walls 13 and 14 which define a power drive section indicated by the general reference numeral 15. At the other side of the housing the lower side wall 17 and the turntable support wall 18 form a relatively lower bowl supporting section 20. This entire housing, preferably formed as a unit, has fastened to it a base plate 22 (FIGS. 2 and 3) on which a number of supporting feet 24 are mounted. Details of the structure of one foot are shown in FIG. 2, but these form no particular part of the present invention.

On the bowl supporting section there is mounted a turntable 25, which as shown in FIG. 4 is suitably fastened to a supporting shaft 27, and this shaft in turn is mounted to rotate about a vertical axis in bearings 28 which are carried in the wall 18 and in the internal support housing cup 29. Again, details of the attachment between the turntable and the shaft, between the shaft and its bearings, and between the housing cup 29 and the main housing, are all conventional and are not described in detail, suitable arrangements being shown for example in FIGS. 3 and 4. It will be understood that the turntable 25 is fixed to rotate with the shaft 27.

The main shaft 30 of the unit is shown particularly in FIG. 3 and includes a central portion of larger diameter on which a worm 32 is formed. On opposite sides of this worm the main shaft is mounted in spaced bearings 33 and 34, and at one end the shaft 30 extends outwardly over the turntable 25, offset toward the rear of the machine with respect to the axis of the turntable as is apparent from FIG. 4. At this outer free end of the shaft 30 there is a hub 35, to which further reference is made hereafter. The bearings 33 are supported in suitable bushings 36 which are in turn fitted into supporting webs 38 formed as integral parts of the main housing. The portion of shaft 30 extending outward beyond bearing 33 has secured to it a V-belt pulley 39 and a toothed drive pulley 40. The drive pulley receives and is driven by a toothed belt 42, sometimes known as a "timing belt," and this belt is in turn driven by a toothed pulley 44 on the output shaft of the drive motor 45. This motor has its supporting base 46 bolted to the rear housing wall 12 as shown in FIG. 2.

Extending downwardly below the supporting web 38, and fastened to the lower cover 48 which encloses the chamber around the worm 32 and bearings 33 and 34, there is a depending support arm 50. This arm in turn carries a bearing 52 at its lower end and the bearing 52 supports one end of a transfer shaft 55. The other end of this shaft is supported in bearing 56 in the housing cup 29, and at the end of shaft 55 there is a drive worm 60 (FIGS. 3 and 4) which meshes with a worm gear 62. This gear in turn is fastened to shaft 27, such that it will drive the turntable 25 when shaft 55 rotates. A V-belt pulley 64 is mounted on the end of shaft 55 within the drive section 15, and a V-belt 65 passes between this pulley and the pulley 39, such that the shaft 55 is rotated whenever the main shaft 30 is driven.

In the turntable 25 there is a bowl 70 which is provided with a raised center portion 71, and to the bowl there is fastened a base attachment ring 72. This ring has on it one or more bayonet fastener lugs 73 which are intended to slide under the arcuate bayonet fastener plates 74, which are suitably secured to the turntable 25, extending out over the mounting slot or depression 75. The connection between the ring 72 and turntable 25 is of the conventional bayonet catch type providing for rigid mounting of the bowl 70 on the turntable and for concurrent rotation thereof. The mounting hub or bushing 35 on shaft 30 provides a support for a collar 77, which in turn supports a pair of cutter knives 80 and 81. These knives are preferably of scimitar-like shape, and they have slotted hubs 82 (FIG. 4) which engage about a like surface on the bushing 35, being held in position by a washer or ring 83 which in turn is clamped against the hub construction by the manually operable knob 85. This knob threads onto an attachment screw 86 which is threaded into the end of shaft 30.

The knife member, provided by the plates 80 and 81, thus rotates with shaft 30 and the tips of the plates describe a circle which has a radius slightly less than the surface of bowl 70. This arrangement is apparent from inspection of FIG. 4, and thus the knife member sweeps across approximately one-half of the bowl 70 as the bowl is rotated past the knife member.

The cutting section is obtained by intersection of the knife plates and a stationary comb or plate 90, provided with slots 92 through which the knife plates pass as they swing upward past the periphery of the bowl. This comb member is provided with a central mounting aperture 93 and a hole which receives a locating pin 94 (FIG. 4). The comb is held clamped in operative position on the supporting boss 95 of the housing by a cooperating section 97 of the protective cover 100. This cover, which is of somewhat dome shape, includes a supporting arm portion 102 terminating in ears 103, as shown in FIGS. 1 and 3. The ears contain bushings 104 which, along with the ears 103 are slotted to pass the flattened hinge pins 105 extending outward from the housing section 15.

It is possible to swing the cover upward as shown in FIG. 6, and to withdraw the ear hinge portions of the cover from the pins 105, since the relieved ends of pins 105 will pass through the slots in the bushings and in the ears. The cover thus can be taken from the machine for cleaning purposes, as can the bowl 70 by releasing its bayonet type attachment to turntable 25. In FIGS. 1, 3 and 4, the protective cover 100 includes portions which extend around most of the periphery of bowl 70, including a section 108 on the cover which projects adjacent to the raised center portion 71 of the bowl. This leaves only entrance and exit openings under the cover through which large chunks placed in the bowl can pass to the cutter knife, and through which the small pieces can exit from beneath the cover.

When the cover is removed, the knife member is dangerously exposed, therefore it is desirable to prevent operation of the machine under such conditions. A safety interlock system is provided for this purpose. A lock cylinder 110 is mounted in the supporting portion 95 of the housing, being held in place by a set screw 111. This cylinder is provided at its top with a slot 112 which will receive the elongated end 115 of a cover lock key 118. The operating handle 120 for this key projects upwardly from the rear of the cover 100, as shown. Within the cylinder 110 there is a barrel 122 having a slot 124 in its upper end also dimensioned to receive the end section 115 of the key. The cylinder is intended rotate within the cylinder 110 and it is held in position by a spring-loaded ball detent 125.

When the slots 124 and 112 are aligned, the end of the key 118 can enter, as shown in FIG. 8, and rotation of the key handle will then turn the barrel 122, causing the end 115 of the key to catch under the interior upper surface of the cylinder 110 as shown in FIG. 4. In this position the cover 100 is locked closed. It will be apparent that the reverse operation will permit the key to be removed from the cylinder, and thus to release the cover 100 for opening.

Projecting downward from the barrel 122 there is a rod 130 which is fastened to the barrel by a cross pin 131. At its lower end the rod extends past an aligning bracket 132, and at the lower end of the rod there is a cavity or hole 135 which forms a part of the interlock arrangement. When this hole is properly aligned, as shown in FIG. 4, it will receive one end of a switch operating push rod 137. If rod 137 is withdrawn, and the depending rod 130 is turned, then it will obstruct motion of the rod 137.

The push rod 137 is driven by a crank 140 attached to a control shaft 142, and that shaft extends outwardly through the wall 17 of the housing, being fixed to the hub 143 of an operating handle 145. Within the base of the machine there is an electrical control switch 150, shown generally in FIGS. 3 and 4, and it is operated between on and off positions by a shaft 152 to which is fixed an operating crank 153. This crank has a slotted end which is received over a pin or ear 155 extending from the push rod 137. Portions of the terminal connections which are a part of the switch 150 are shown in FIG. 3.

It will be understood that the switch 150 is open in the off position and closed in the on position, and it controls the supply of electrical power to motor 45. In view of the foregoing description, it will be obvious that the operator can move the handle 145 to close switch 150 only when the cover 100 is locked down in its operated position, at which time the hole 135 in rod 130 is properly aligned to receive the end of push rod 137.

The power take-off shaft 160 (FIG. 7) is mounted in suitable bearings 161 which are supported in an auxiliary coupling and mounting piece 162. This piece in turn is fastened to the upper front portion of the housing wall 11, such that its center line is somewhat above and extends across the power take-off worm 32. A worm gear 164 is secured to the end of shaft 160 and is driven from the worm 32 to provide the power take-off drive which is at a substantially slower speed than the rotation of shaft 30, due to the nature of the worm-gear drive.

The outer end of the housing piece 162 is provided with a tapered bore 165 adapted to receive the mounting nose of food preparing accessories or attachments which have similarly tapered surfaces. A small segment of such an accessory drive connection is shown at 167, with the rectangular driving end of its power shaft indicated at 168. This end piece fits within a similarly shaped socket 170 formed in the end of the power take-off control shaft 172, thereby forming a spline-like drive arrangement for the accessory. The facing ends of shafts 160 and 172 are provided with cooperating dog clutch teeth 175 which can be engaged or disengaged by shifting the shaft 172 within its housing.

For this purpose the shaft 172 is undercut at 176 to receive a pin 178 mounted eccentrically on the end of a rotatable control shaft 180. This shaft is held in place in the housing piece 162 by a set screw 181, and it can be turned by manipulation of the control handle 184 which is secured to the outwardly protruding end of the shaft 180. The portions of the housing 162 which extend forwardly beyond the main housing wall 11 are preferably covered by a protective cover 185 which also provides a smooth outer surface configuration to the power take-off coupling and mounting. In order to secure the hub of the accessory in the coupling housing 162, an adjustable set screw 188 (FIGS. 1, 3 and 4) is provided, and it can be turned inward in the usual manner to clamp against the mounting nose piece of the accessory.

The food cutting machine provided by this invention thus provides an auxiliary or power take-off attachment coupling which is centered with respect to the power drive section of the machine, and which is substantially closer to the bowl 70 than in previous machines of this type. This is an advantage where it is desired to use power driven attachments or accessories which may have some cooperative relation with the food cutting bowl, since it is not necessary to span a relatively long distance across the machine with such accessories. Furthermore, the power take-off worm 32 is rigidly mounted between supporting bearings, and the power take-off shaft 160 likewise has a rigid mounting within the main housing of the machine. The dog clutch members 175, together with the control therefore, provide for selective driving of an attachment mounted on the power take-off coupling, while the main drive to the food cutter is continued.

The mounting arrangement and construction of the main drive is also advantageous in that different forms of motors can be readily supplied in the machine. For example, the same basic machine can be manufactured for use in countries which have 60 cycle or 50 cycle electrical power, or electrical power at different voltages, merely by substituting an appropriate motor. The timing belt drive from the motor to the main shaft is positive and is readily accessible for maintenance, merely by inverting the housing and removing the piece 22. The mechanical power interlock arrangement, incorporated in the cover hold down clamp, is likewise a feature which is of relatively simple construction, and which positively prevents the protective cover from being removed while the machine is running, and prevents the machine from being operated if the cover has already been removed.

While the form of apparatus herein described constitutes a preferred embodiment of the invention, it is to be understood that this invention is not limited to this precise form of apparatus and that changes may be made therein without departing from the scope of the invention which is defined in the appended claims.

What is claimed is:

1. In a food cutting machine, a housing including a base and front, rear, and side walls forming a power drive section and a lower bowl supporting section at opposite sides of the housing, a main drive shaft mounted cross-wise of said power drive section and having one end extending over said bowl supporting section, a rotatable bowl mounted on said bowl supporting section beneath said shaft, at least one cutter knife fixed to said one end of said shaft and rotatable thereby to cut material contained in said bowl, bearing means in said drive section supporting said main shaft, a power take-off connection from said main shaft intermediate its ends and within said power drive section including an auxiliary shaft extending toward said front wall, a coupling on said auxiliary shaft for selective attachment to food preparation accessories, a drive connection between said main shaft and said bowl supporting section for powered rotation of said bowl when said knife is rotated, a motor removably mounted in said housing in parallel spaced relation to said main shaft, and a power drive connection between said motor and the other end of said main shaft.

2. In a food cutting machine, a housing including a base and front, rear, and side walls forming a power drive section and a lower bowl supporting section at opposite sides of the housing, a main drive shaft mounted cross-wise of said power drive section and having one end extending over said bowl supporting section, a rotatable bowl mounted on said bowl supporting section beneath said shaft, at least one cutter knife fixed to said end of said shaft and rotatable thereby to cut material contained in said bowl, a pair of spaced bearings in said drive section supporting said main shaft, a power take-off connection from said main shaft located between said bearings and including an auxiliary shaft extending toward said front wall, gears incorporated in said power take-off for driving said auxiliary shaft from said main shaft at a substantially slower speed than said main shaft, a coupling on said auxiliary shaft for selective attachment to food preparation accessories, a drive connection between said main shaft and said bowl supporting section for powered rotation of said bowl when said knife is rotated, a motor mounted in said housing, and a power drive connection between said motor and said main shaft.

3. In a food cutting machine, a housing including a base and front, rear, and side walls forming a power drive section and a lower bowl supporting section at opposite sides of the housing, a main drive shaft mounted cross-wise of said power drive section and extending over said bowl supporting section, a rotatable bowl mounted on said bowl supporting section beneath said shaft, at least one cutter knife fixed to said shaft and rotatable thereby to cut material contained in said bowl, bearing means in said drive section supporting said main shaft, a power take-off connection from said main shaft including an auxiliary shaft extending toward said front wall, a coupling on said auxiliary shaft for selective attachment to food preparation accessories, a selectively operable clutch means incorporated between said auxiliary shaft and said coupling, a drive connection between said main shaft and said bowl supporting section for powered rotation of said bowl when said knife is rotated, a motor removably mounted in said housing in spaced relation to said main shaft, and a power drive connection between said motor and said main shaft.

4. A food cutting machine for reducing chunks of foodstuff to small pieces, comprising a housing having a power drive section and a relatively lower bowl supporting section, a turntable mounted for rotation on said lower section about a vertical axis, a bowl formed generally in the shape of a half of a torus and removably attached to said turntable, a main shaft having one end extending horizontally from said drive section over said bowl in offset relation to said axis of said turntable and generally aligned with the center of a section of said bowl, a cutter knife fixed to said one end of said shaft and rotatable thereby to follow a vertical circular path a portion of which is adjacent to the section of said bowl beneath said knife, a motor mounted in said housing below said main shaft and having a belt drive connection to the other end of said main shaft, bearing means in said power drive section of said housing supporting said main shaft, an auxiliary shaft also mounted in said power drive section along an axis transverse to said main shaft, meshing gears on said main shaft and said auxiliary shaft for driving said auxiliary shaft from said main shaft and at a substantially slower speed than said main shaft, a coupling mounted in said housing and accessible from the exterior of said drive section for selective attachment to food preparation accessories, and a drive connection between said main shaft and said turntable providing for rotation of said turntable in predetermined ratio to the rotation of said knife.

5. A food cutting machine for reducing chunks of food stuff to small pieces, comprising a housing having a relatively higher power drive section and a relatively lower bowl supporting section, a turntable mounted for rotation on said lower section about a vertical axis, a bowl formed generally in the shape of a half of a torus and removably attached to said turntable, a main shaft having one end extending horizontally from said drive section over said bowl in offset relation to said axis of said turntable and generally aligned with the center of a section of said bowl, a cutter knife fixed to said one end of said shaft and rotatable thereby to follow a circular path a portion of which is adjacent to the section of said bowl beneath said knife, a motor mounted in said housing generally parallel with said main shaft and having a drive connection to the other end of said main shaft, spaced bearing means in said power drive section of said housing supporting said main shaft, an auxiliary shaft also mounted in said power drive section along an axis transverse to said main shaft and intermediate said bearing means, a drive connection between said main shaft and said auxiliary shaft for concurrent rotation thereof, a coupling mounted in said housing and accessible from the exterior of said drive section for selective attachment to food preparation accessories, a selectively operable drive connection between said auxiliary shaft and said coupling, and a drive connection between said main shaft and said turntable providing for rotation of said turntable in predetermined ratio to the rotation of said knife.

6. In a food cutting machine, a housing including a base and front, rear, and side walls forming a power drive section and a lower bowl supporting section at opposite sides of the housing, a main drive shaft mounted crosswise of said power drive section and having one end extending over said bowl supporting section, a rotatable bowl mounted on said bowl supporting section beneath said shaft, at least one cutter knife fixed to said one end of said shaft and rotatable thereby to cut material contained in said bowl, spaced bearings in said drive section supporting said main shaft, a power take-off connection from said main shaft intermediate said bearings and within said power drive section including an auxiliary shaft extending toward said front wall and driven from said main shaft at a substantially slower speed than said main shaft, a coupling on said auxiliary shaft for selective attachment to food preparation accessories, a drive connection between said main shaft and said bowl supporting section for powered rotation of said bowl when said knife is rotated, a motor having an output shaft, means mounting said motor in said housing with its said output shaft spaced from said main shaft, and a power drive connection between said motor output shaft and the other end of said main shaft providing for direct access to said power drive connection.

7. A food cutting machine as defined in claim 6 wherein said power drive connection includes pulleys on said other end of said main shaft and on said motor output shaft, and a replaceable belt connecting said pulleys.

References Cited by the Examiner
UNITED STATES PATENTS

| | | | |
|---|---|---|---|
| 2,005,374 | 6/35 | Johnston et al. | 146—67 |
| 2,072,681 | 3/37 | Meeker et al. | 146—67 |
| 2,245,012 | 6/41 | Robinson | 146—67 |

J. SPENCER OVERHOLSER, *Primary Examiner.*

UNITED STATES PATENT OFFICE
CERTIFICATE OF CORRECTION

Patent No. 3,194,287                      July 13, 1965

David A. Meeker

It is hereby certified that error appears in the above numbered patent requiring correction and that the said Letters Patent should read as corrected below.

In the grant (only), line 1, name of inventor, for "David A. Meeler" read -- David A. Meeker --; column 2, line 36, for "frone" read -- front --; column 3, line 49, for "section" read -- action --; column 4, line 15, after "intended" insert -- to --; column 6, line 10, after "said", second occurrence, insert -- one --.

Signed and sealed this 21st day of December 1965.

(SEAL)
Attest:

ERNEST W. SWIDER
Attesting Officer

EDWARD J. BRENNER
Commissioner of Patents